United States Patent
Bollineni

(10) Patent No.: US 12,166,799 B2
(45) Date of Patent: Dec. 10, 2024

(54) USING ZONES BASED ON ENTRY POINTS AND EXIT POINTS OF A NETWORK DEVICE TO APPLY A SECURITY POLICY TO NETWORK TRAFFIC

(71) Applicant: Juniper Networks, Inc., Sunnyvale, CA (US)

(72) Inventor: Anil Kumar Bollineni, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 302 days.

(21) Appl. No.: 17/643,954

(22) Filed: Dec. 13, 2021

(65) Prior Publication Data

US 2023/0188570 A1 Jun. 15, 2023

(51) Int. Cl.
*H04L 9/40* (2022.01)
*G06F 16/2455* (2019.01)

(52) U.S. Cl.
CPC .......... *H04L 63/20* (2013.01); *G06F 16/2455* (2019.01); *H04L 63/1425* (2013.01)

(58) Field of Classification Search
CPC ............. H04L 63/0209; H04L 63/0263; H04L 63/1425; H04L 63/20; G06F 16/2455
See application file for complete search history.

(56) References Cited

U.S. PATENT DOCUMENTS

| | | | |
|---|---|---|---|
| 7,305,459 B2 * | 12/2007 | Klemba | .................. H04L 45/00 709/249 |
| 8,316,435 B1 | 11/2012 | Kannan | |
| 2005/0015471 A1 * | 1/2005 | Zhang | .................. H04L 67/1001 726/4 |
| 2010/0182395 A1 * | 7/2010 | Delhoyo | ............. H04L 12/1818 348/14.08 |
| 2011/0225114 A1 * | 9/2011 | Gotthardt | ............... G16H 10/20 706/50 |
| 2013/0254871 A1 | 9/2013 | Yi | |
| 2013/0298201 A1 * | 11/2013 | Aravindakshan | ..... H04L 69/164 726/4 |

(Continued)

FOREIGN PATENT DOCUMENTS

EP 1689206 A1 8/2006

OTHER PUBLICATIONS

Extended European Search Report for Application No. EP22155700.2, mailed on Jul. 26, 2022, 7 pages.

*Primary Examiner* — Mohammad A Siddiqi
(74) *Attorney, Agent, or Firm* — Harrity & Harrity, LLP

(57) ABSTRACT

A network device may be configured to receive network traffic. The network device may be configured to identify one or more entry points of the network device associated with the network traffic and to determine, based on the one or more entry points of the network device, a source zone associated with the network traffic. The network device may be configured to identify one or more exit points of the network device associated with the network traffic and to determine, based on the one or more exit points of the network device, a destination zone associated with the network traffic. The network device may be configured to identify, based on the source zone and the destination zone, a set of security policies and to apply a security policy, of the set of security policies, to the network traffic.

20 Claims, 10 Drawing Sheets

(56) References Cited

U.S. PATENT DOCUMENTS

| | | | | |
|---|---|---|---|---|
| 2015/0358433 | A1* | 12/2015 | Parthasarathy | H04L 45/745 370/392 |
| 2015/0363481 | A1* | 12/2015 | Haynes | G06Q 10/10 707/748 |
| 2016/0294874 | A1* | 10/2016 | Sun | H04L 63/20 |
| 2019/0249240 | A1* | 8/2019 | Rothberg | H01S 3/0941 |
| 2020/0059491 | A1* | 2/2020 | Nukala | H04L 63/0227 |
| 2020/0059492 | A1* | 2/2020 | Janakiraman | H04L 41/0893 |
| 2020/0137121 | A1* | 4/2020 | Rogers | H04L 63/20 |
| 2020/0322390 | A1* | 10/2020 | Rogers | H04L 63/06 |
| 2021/0258381 | A1* | 8/2021 | Martini | G06F 9/45533 |

\* cited by examiner

USING ZONES BASED ON ENTRY POINTS AND EXIT POINTS OF A NETWORK DEVICE TO APPLY A SECURITY POLICY TO NETWORK TRAFFIC

BACKGROUND

A network device uses security policies to enforce rules for routing network traffic via the network device. A security policy can indicate, for example, what kind of network traffic can be routed by the network device, what actions the network device needs to take when routing the network traffic, and/or where the network traffic can be routed.

SUMMARY

Some implementations described herein relate to a network device. The network device may include one or more memories and one or more processors. The network device may be configured to receive network traffic. The network device may be configured to identify one or more entry points of the network device associated with the network traffic. The network device may be configured to determine, based on the one or more entry points of the network device, a source zone associated with the network traffic. The network device may be configured to identify one or more exit points of the network device associated with the network traffic. The network device may be configured to determine, based on the one or more exit points of the network device, a destination zone associated with the network traffic. The network device may be configured to identify, based on the source zone and the destination zone, a set of security policies. The network device may be configured to apply a security policy, of the set of security policies, to the network traffic.

Some implementations described herein relate to a non-transitory computer-readable medium that stores a set of instructions for a network device. The set of instructions, when executed by one or more processors of the network device, may cause the network device to receive network traffic. The set of instructions, when executed by one or more processors of the network device, may cause the network device to determine, based on one or more entry points of the network device that are associated with the network traffic, a source zone associated with the network traffic. The set of instructions, when executed by one or more processors of the network device, may cause the network device to determine, based on one or more exit points of the network device that are associated with the network traffic, a destination zone associated with the network traffic. The set of instructions, when executed by one or more processors of the network device, may cause the network device to identify, based on the source zone and the destination zone, a set of security policies. The set of instructions, when executed by one or more processors of the network device, may cause the network device to apply a security policy, of the set of security policies, to the network traffic.

Some implementations described herein relate to a method. The method may include receiving, by a network device, network traffic. The method may include determining, by the network device and based on one or more entry points of the network device that are associated with the network traffic, a source zone associated with the network traffic. The method may include determining, by the network device and based on one or more exit points of the network device that are associated with the network traffic, a destination zone associated with the network traffic. The method may include applying, by the network device and based on the source zone and the destination zone, a security policy to the network traffic.

DETAILED DESCRIPTION

Figure 1A:
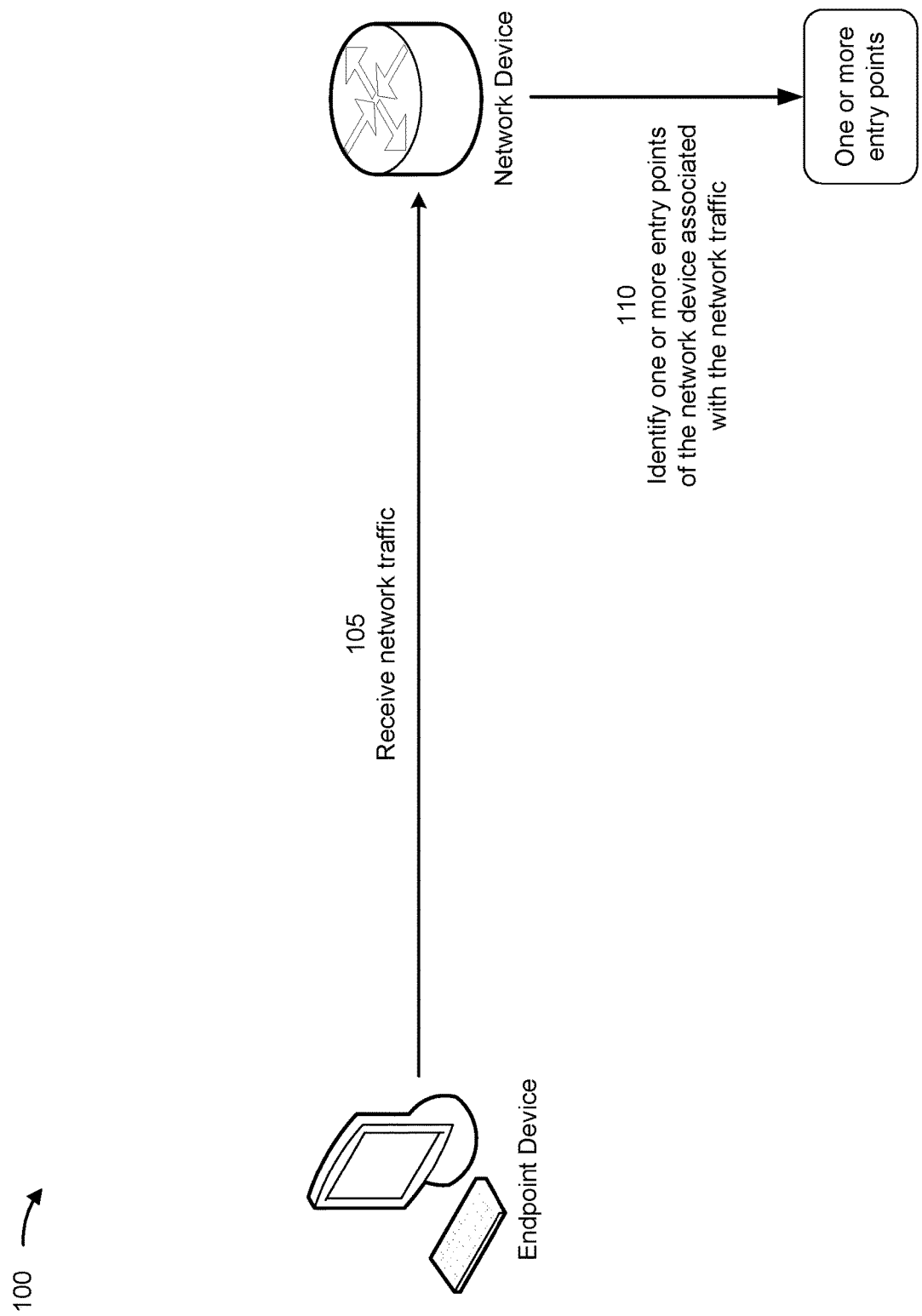
FIGS. 1A-1F are diagrams of an example implementation described herein.

The following detailed description of example implementations refers to the accompanying drawings. The same reference numbers in different drawings may identify the same or similar elements.

In many cases, a network device may use a security zone context to define a security policy for handling network traffic. For example, a security policy may indicate one or more rules for network traffic that has an origin in a "from" zone and is to route to a destination in a "to" zone. However, such zones are typically associated with network interfaces that will belong to one or more routing instances associated with the network traffic (e.g., that indicate final addresses, such as Internet protocol (IP) addresses, of the origin and the destination of the network traffic). This can cause issues when the one or more routing instances are changed. For example, when network traffic associated with a communication session is received via a different interface of the network device than is expected for a particular zone of a particular routing instance associated with a security policy, the network device may tear down the communication session and establish a new communication session for the network traffic. Consequently, network traffic may be prevented from being routed by the network device during a period of time after the communication session is torn down and before the new communication session is established. Further, in some cases, the new session may not be established correctly, which further prevents the network traffic from being forwarded by the network device (e.g., due to incorrect configuration of routing instances) while the new session is established. Prevention of network traffic from being forwarded is often referred to as network traffic blackholing.

Some implementations described herein provide a network device that receives network traffic and determines one or more entry points (e.g., an entry port and/or an entry interface) of the network device that are associated with the network traffic and one or more exit points (e.g., an exit port and/or an exit interface) of the network device that are associated with the network traffic. The network device determines, based on the one or more entry points, a source zone associated with the network traffic and determines, based on the one or more exit points, a destination zone associated with the network traffic. Additionally, or alternatively, the network device determines, based on the source zone, a source zone group that is associated with the source zone and determines, based on the destination zone, a destination zone group that is associated with the destination zone. Accordingly, the network device identifies, based on the source zone, the destination zone, the source zone group, and/or the destination zone group, a set of security policies (e.g., one or more security policies). The network device applies a security policy, of the set of security policies, to the network traffic, which causes the network device to allow the network traffic or to block the network traffic.

In this way, some implementations described herein facilitate determination of zones based on entry points and exit points of the network device, and not based on routing instances associated with the network traffic. Thus, the network device provides security (e.g., by identifying and applying a security policy based on the zones or zone groups) without association with a routing domain (e.g., that is based on routing instances).

Accordingly, some implementations described herein enable the network device to apply a security policy to network traffic based on "local" zones of the network device, which decreases a likelihood that a communication session for network traffic will be torn down because the network device receives the network traffic via a different interface of the network device (e.g., because the security policy is not associated with a routing instance). Thus, some implementations described herein prevent (or reduce) network traffic blackholing (e.g., by decreasing a likelihood of waiting for a new session to be established). Further, this reduces an amount of computing resources (e.g., processing resources, memory resources, communication resources, and/or power resources, among other examples) that would otherwise need to be used to resend network traffic that was lost due to blackholing and/or to diagnose and/or to address the cause and/or effect of the blackholing.

FIGS. 1A-1F are diagrams of an example 100 associated with using zone groups based on entry points and exit points of a network device to apply a security policy to network traffic. As shown in FIGS. 1A-1F, example 100 includes an endpoint device and a network device associated with a network. Further details of the endpoint device, the network device, and the network are provided elsewhere herein.

As shown in FIG. 1A, and by reference number 105, the network device may receive network traffic. For example, the endpoint device may send the network traffic to the network device to cause the network device to forward the network traffic to a destination (e.g., another endpoint device). In some implementations, the network device may receive the network traffic via one or more entry points of the network device. For example, the network device may receive the network traffic via at least one of an entry port of the network device (e.g., a physical entry port of the network device) or an entry interface of the network device (e.g., a logical entry interface of the network device). The network traffic may include, for example, one or more packets (e.g., not sent in a packet stream) or a flow of packets (e.g., sent in a packet stream).

As shown by reference number 110, the network device may identify the one or more entry points of the network device that are associated with the network traffic. For example, the network device may determine that the network device received the network traffic via at least one of the entry port of the network device or the entry interface of the network device. Accordingly, the network device may identify at least one of the entry port of the network device or the entry interface of the network device as the one or more or entry points of the network device.

Figure 1B:
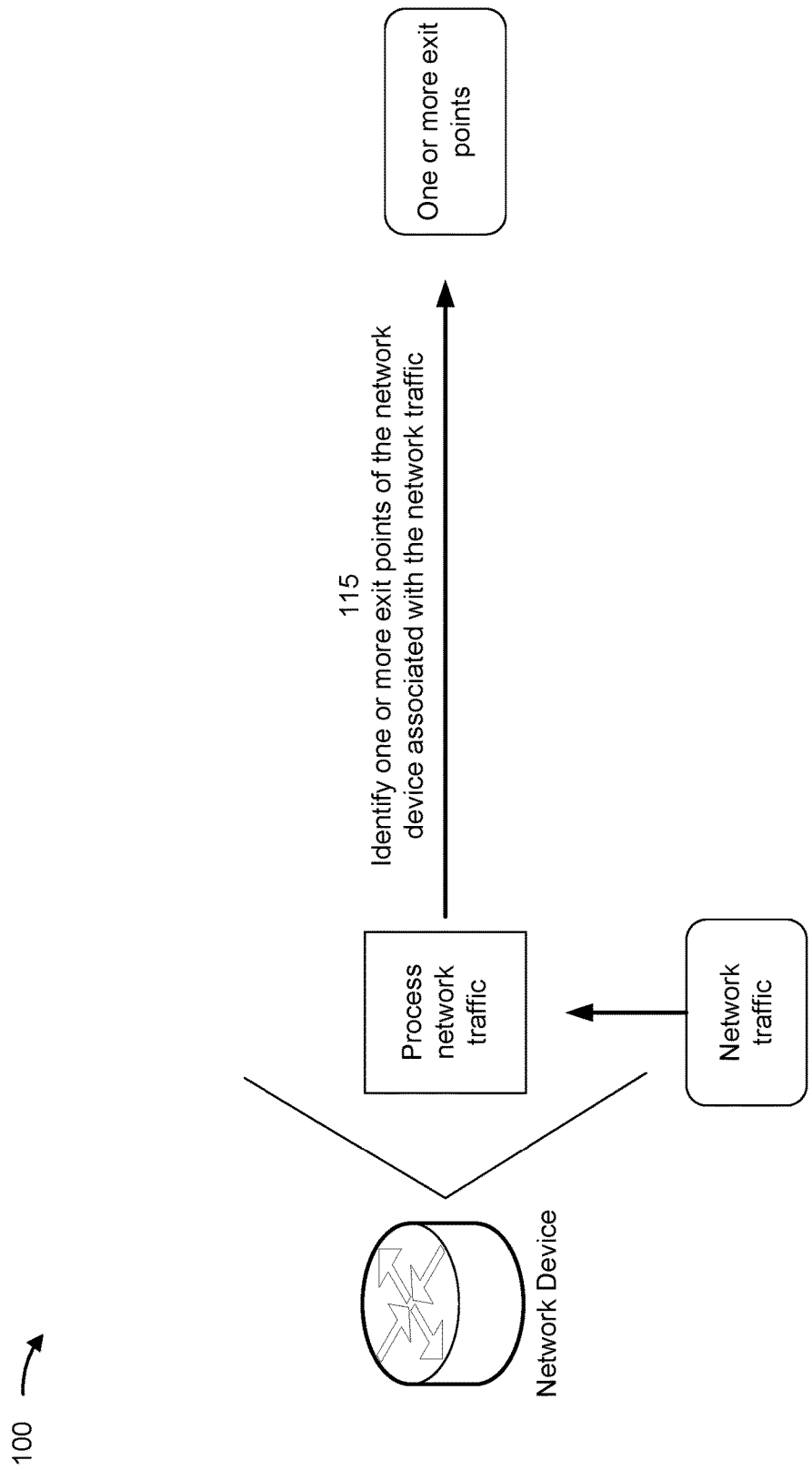

As shown in FIG. 1B, and by reference number 115, the network device may identify one or exit points of the network device that are associated with the network traffic (e.g., one or more exit points of the network device on which the network device is to forward the network traffic). For example, the network device may process (e.g., parse or read) the network traffic to identify a destination of the network traffic (e.g., as indicated by a header of a packet of the network traffic or another data element of the network traffic). The destination may be another network device, another endpoint device, or another device to which the network device is to forward the network traffic. The network device may search, based on the destination, a data structure (e.g., a database, an electronic folder, and/or an electronic file that is included in the network device and/or accessible to the network device) to identify the one or more exit points of the network device. For example, the network device may identify, in the data structure, an entry that is associated with the destination and that indicates the one or more exit points of the network device. The network device may process (e.g., parse or read) the entry to identify the one or more exit points of the network device.

The one or more exit points of the network device may include, for example, at least one of an exit port of the network device or an exit interface of the network device (e.g., on which the network device is to forward the network traffic). In some implementations, to identify the one or more exit points of the network device, the network device may search, based on the destination of the network traffic, a data structure (e.g., that is the same as or different than the data structure described above) to identify at least one of the exit port of the network device or the exit interface of the network device. For example, the network device may identify, in the data structure, an entry that is associated with the destination and that indicates at least one of the exit port of the network device or the exit interface of the network device. The network device may process (e.g., parse or read) the entry to identify at least one of the exit port of the network device or the exit interface of the network device. Accordingly, the network device may identify at least one of the exit port of the network device or the exit interface of the network device as the one or more exit points of the network device.

Figure 1C:
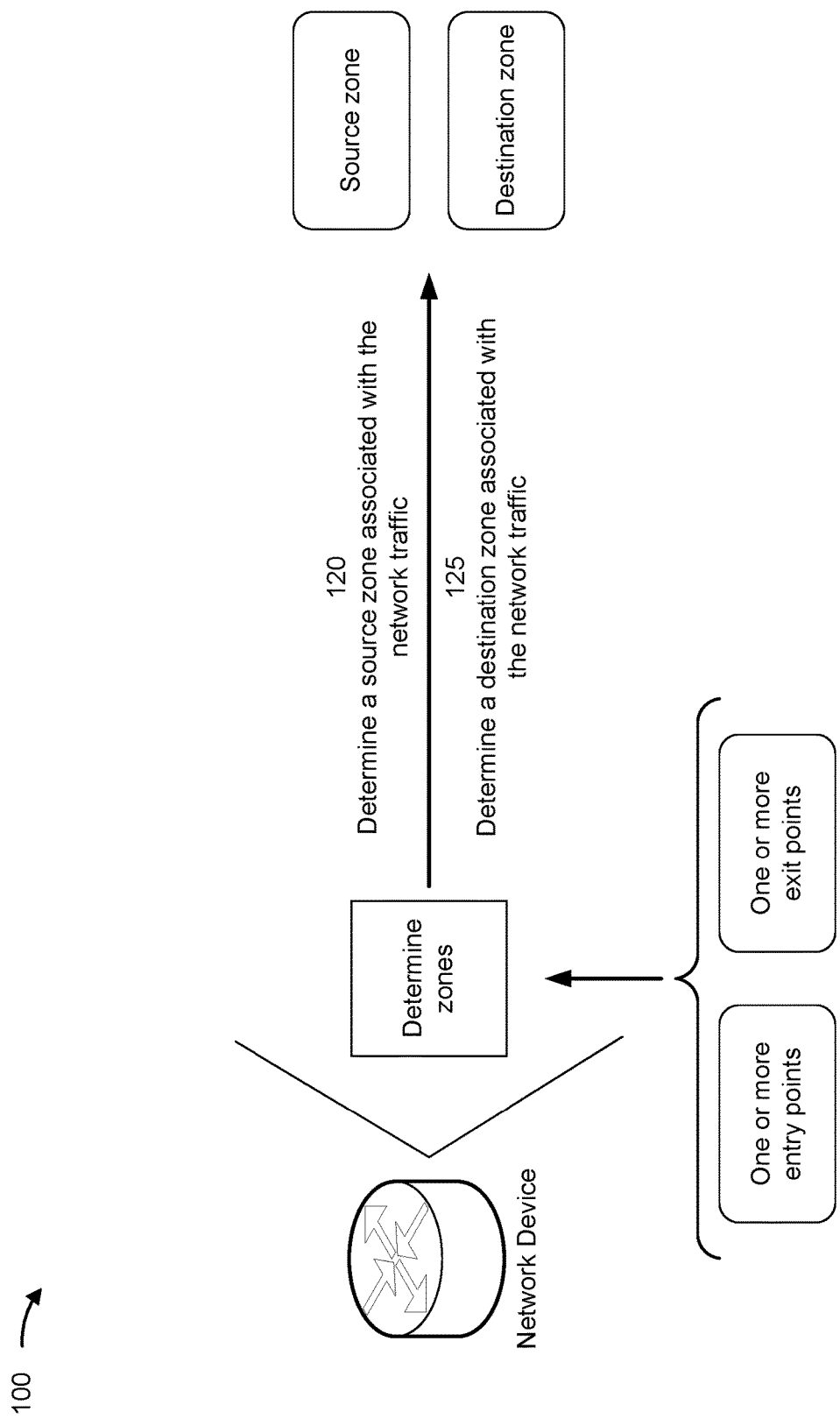

As shown in FIG. 1C, and by reference number 120, the network device may determine a source zone associated with the network traffic (e.g., based on the one or more entry points of the network device). In some implementations, the network device may search, based on the one or more entry points of the network device, a data structure (e.g., that is the same as or different than the data structures described above) to determine the source zone associated with the network traffic. For example, the network device may identify, in the data structure, an entry that is associated with the one or more entry points of the network device and that indicates the source zone associated with the network traffic. The network device may process (e.g., parse or read) the entry to identify the source zone associated with the network traffic. In some implementations, the source zone may be an identifier (e.g., a text string) that identifies the one or more entry points of the network device on which the network device received the network traffic.

As shown by reference number 125, the network device may determine a destination zone associated with the network traffic (e.g., based on the one or more exit points of the network device). In some implementations, the network device may search, based on the one or more exit points of the network device, a data structure (e.g., that is the same as or different than the data structures described above) to determine the destination zone associated with the network traffic. For example, the network device may identify, in the data structure, an entry that is associated with the one or more exit points of the network device and that indicates the destination zone associated with the network traffic. The network device may process (e.g., parse or read) the entry to identify the destination zone associated with the network traffic. In some implementations, the destination zone may be an identifier (e.g., a text string) that identifies the one or more exit points of the network device on which the network device is to forward the network traffic.

Figure 1D:
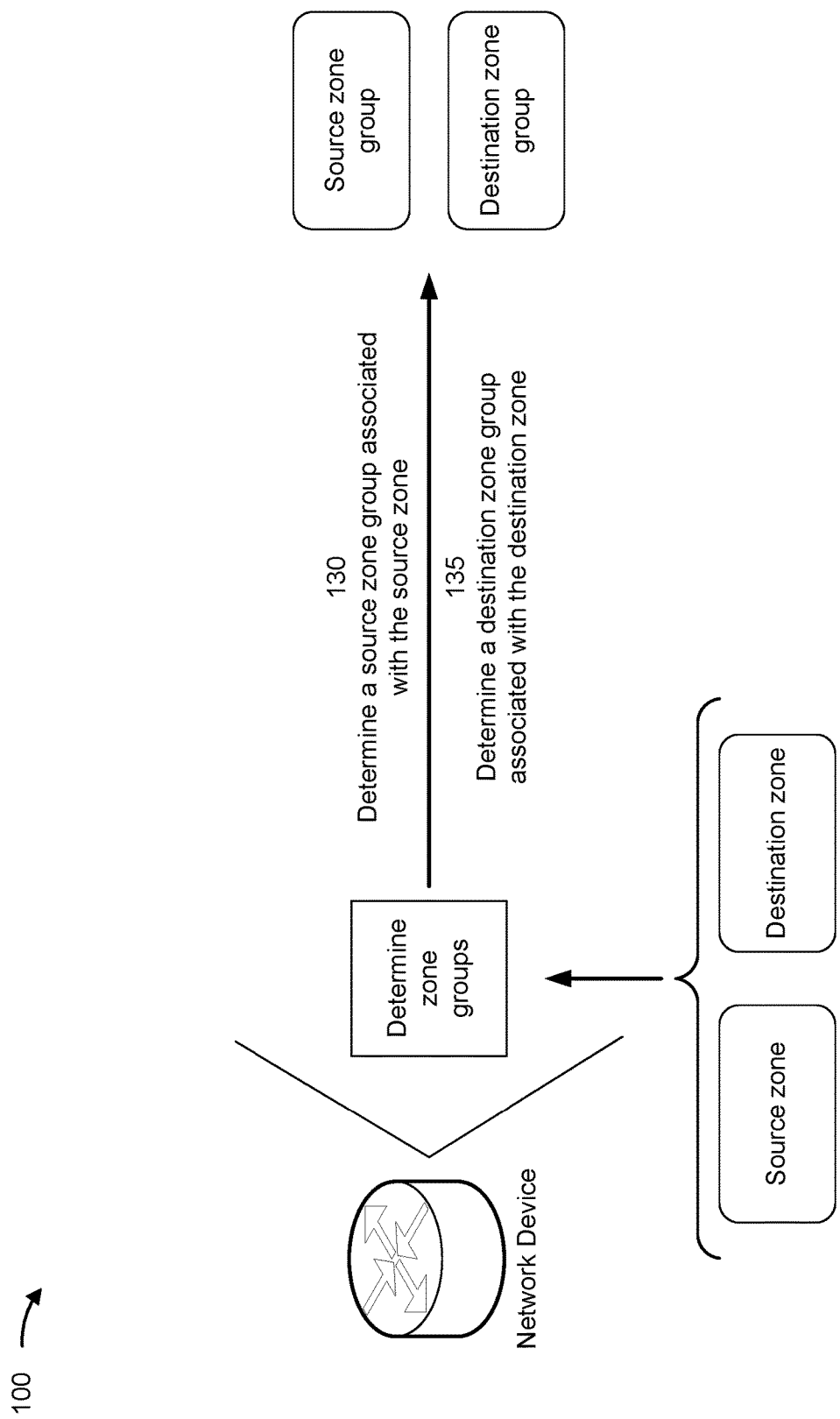

As shown in FIG. 1D, and by reference number 130, the network device may determine a source zone group associated with the source zone (e.g., based on the source zone). In some implementations, the network device may search, based on the source zone, a data structure (e.g., that is the same as or different than the data structures described above) to identify the source zone group associated with the source zone. For example, the network device may identify, in the data structure, an entry that is associated with the source zone and that indicates the source zone group associated with the source zone. The network device may process (e.g., parse or read) the entry to identify the source zone group associated with the source zone. The source zone group may include the source zone and, in some implementations, one or more other source zones associated with other network traffic.

As shown by reference number 135, the network device may determine a destination zone group associated with the destination zone (e.g., based on the destination zone). In some implementations, the network device may search, based on the destination zone, a data structure (e.g., that is the same as or different than the data structures described above) to identify the destination zone group associated with the destination zone. For example, the network device may identify, in the data structure, an entry that is associated with the destination zone and that indicates the destination zone group associated with the destination zone. The network device may process (e.g., parse or read) the entry to identify the destination zone group associated with the destination zone. The destination zone group may include the destination zone and, in some implementations, one or more other destination zones associated with other network traffic.

Figure 1E:
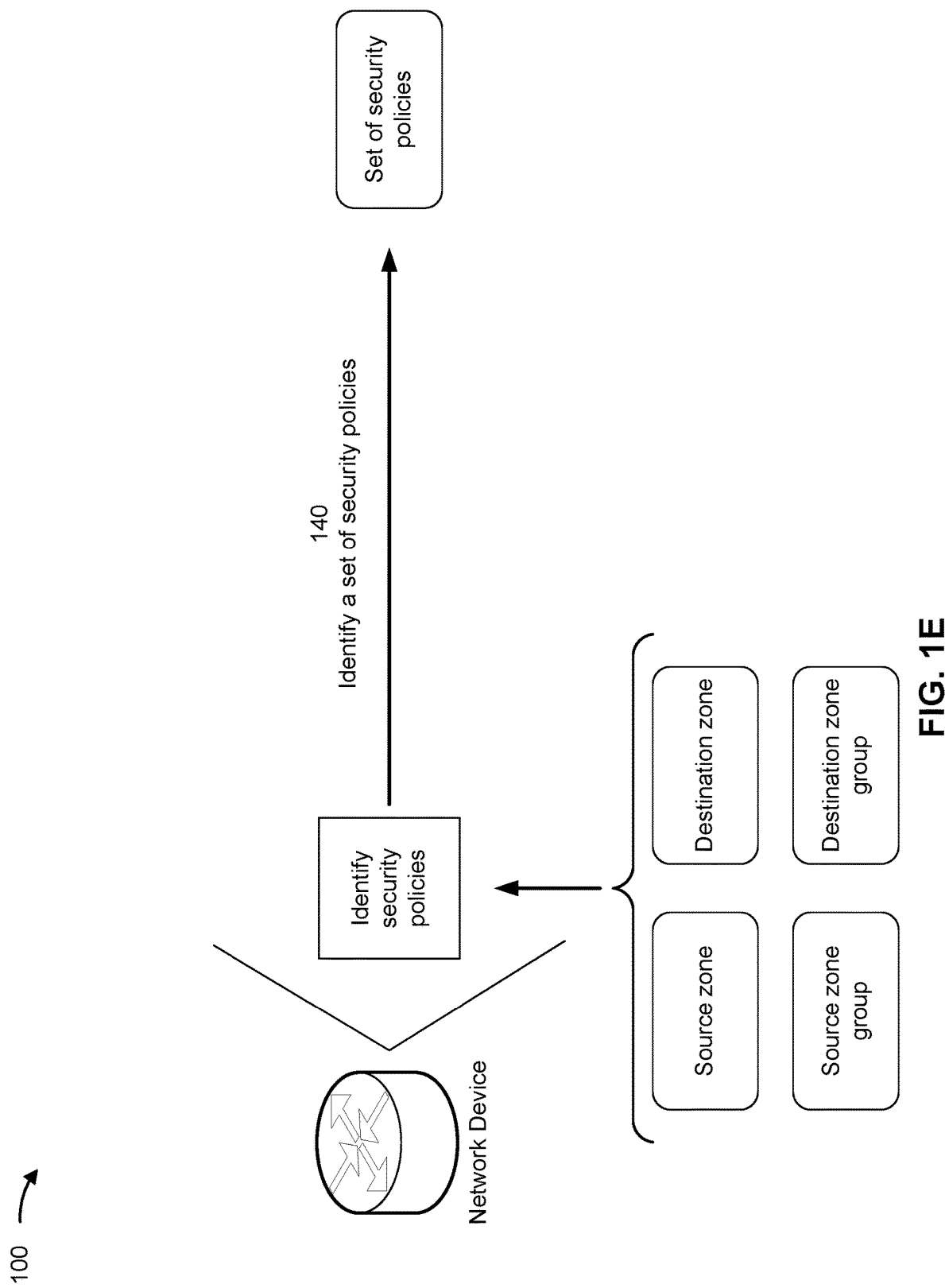

As shown in FIG. 1E, and by reference number 140, the network device may identify (e.g., based on the source zone and the destination zone) a set of security policies (e.g., one or more security policies). In some implementations, the network device may search, based on the source zone and the destination zone, a data structure (e.g., that is the same as or different than the data structures described above) to identify a set of security policies. For example, the network device may identify, in the data structure, an entry that is associated with the source zone and the destination zone and that indicates the set of security policies. The network device may process (e.g., parse or read) the entry to identify the set of security policies. In some implementations, each security policy, of the set of security policies, may include one or more rules for allowing or blocking network traffic (e.g., when the security policy is applied to network traffic by the network device).

In some implementations, the network device may identify the set of security policies based on the source zone group and the destination zone group. The network device may search, based on the source zone group and the destination zone group, a data structure (e.g., that is the same as or different than the data structures described above) to identify the set of security policies. For example, the network device may identify, in the data structure, an entry that is associated with the source zone group and the destination zone group and that indicates the set of security policies. The network device may process (e.g., parse or read) the entry to identify the set of security policies.

In some implementations, the network device may identify the set of security policies based on the source zone, the destination zone, the source zone group, and the destination zone group. For example, the network device may determine, based on the source zone and the destination zone, a first subset of security policies (e.g., that includes one or more security policies) and may determine, based on the source zone group and the destination zone group, a second subset of security policies (e.g., that includes one or more security policies). Accordingly, the network device may identify the set of security policies as including the first subset of security policies and the second subset of security policies.

In some implementations, to identify the first subset of security policies, the network device may search, based on the source zone and the destination zone, a data structure (e.g., that is the same as or different than the data structures described above). For example, the network device may identify, in the data structure, an entry that is associated with the source zone and the destination zone and that indicates the first subset of security policies. The network device may process (e.g., parse or read) the entry to identify the first subset of security policies. In some implementations, to identify the second subset of security policies, the network device may search, based on the source zone group and the destination zone group, another data structure (e.g., that is the same as or different than the data structures described above). For example, the network device may identify, in the data structure, an entry that is associated with the source zone group and the destination zone group and that indicates the second subset of security policies. The network device may process (e.g., parse or read) the entry to identify the second subset of security policies.

Figure 1F:
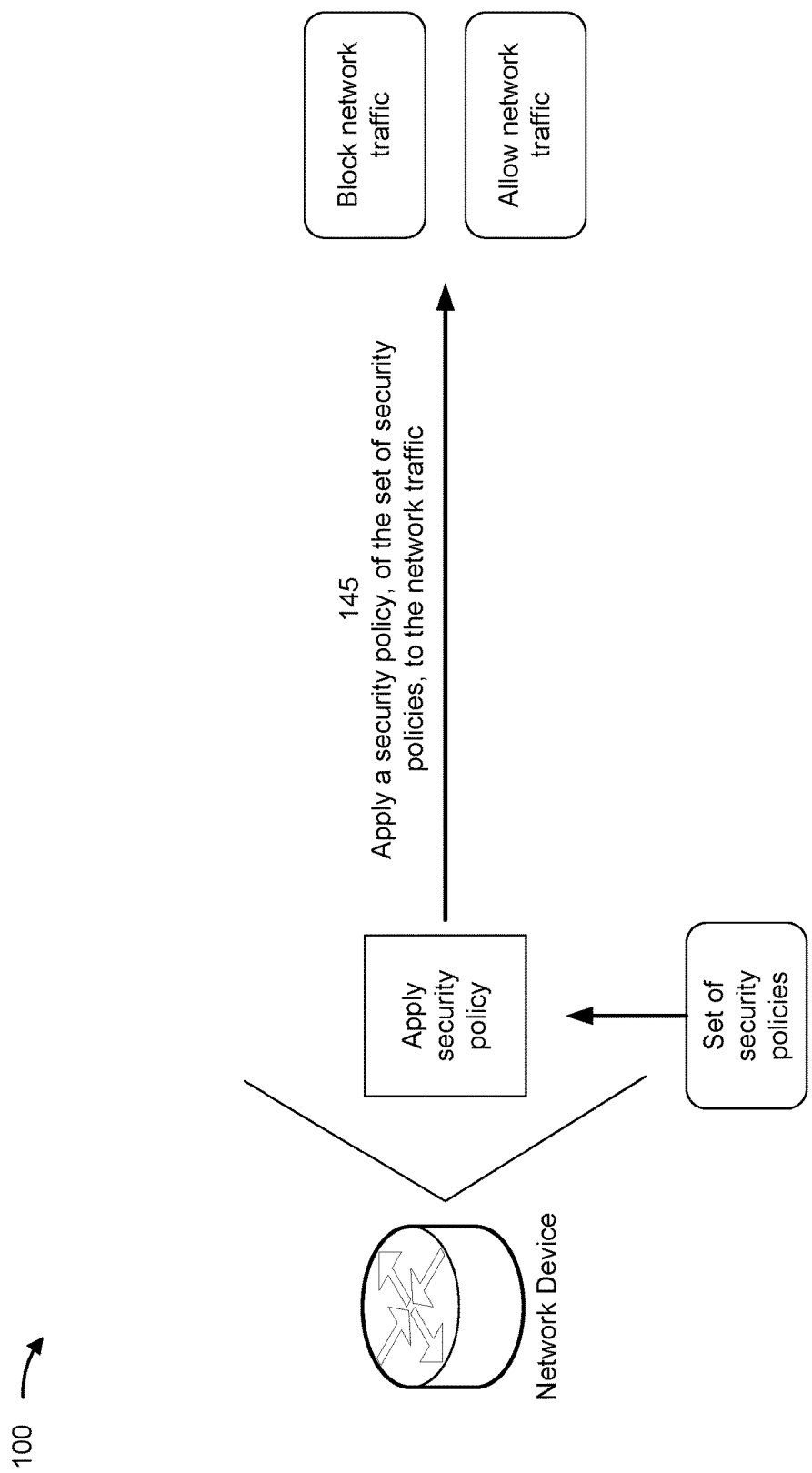

As shown in FIG. 1F, and by reference number 145, the network device may apply a security policy, of the set of security policies, to the network traffic. For example, the network device may process the network traffic to identify one or more characteristics of the network traffic (e.g., a type of the network traffic, a type of a payload of the network traffic, and/or a packet pattern of the network traffic, among other examples). Accordingly, the network device may identify a security policy, of the set of security policies, as applicable to the one or more characteristics of the network traffic (e.g., the security policy includes one or more rules that correspond to at least some of the one or more characteristics of the network traffic) and may apply the security policy to the network traffic.

As further shown in FIG. 1F, applying the security policy to the network traffic may cause the network device to block the network traffic or to allow the network traffic. For example, when the network device determines, based on applying the security policy, that the security policy is satisfied (e.g., the one or more rules of the security policy are satisfied by at least some of the one or more characteristics of the network traffic), the network device may allow the network traffic. The network device may allow the network traffic by forwarding the network traffic to the destination of the network traffic. As another example, when the network device determines, based on applying the security policy, that the security policy is not satisfied (e.g., at least one of the one or more rules of the security policy are not satisfied by the one or more characteristics of the network traffic), the network device may block the network traffic. The network device may block the network traffic by dropping or discarding the network traffic.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
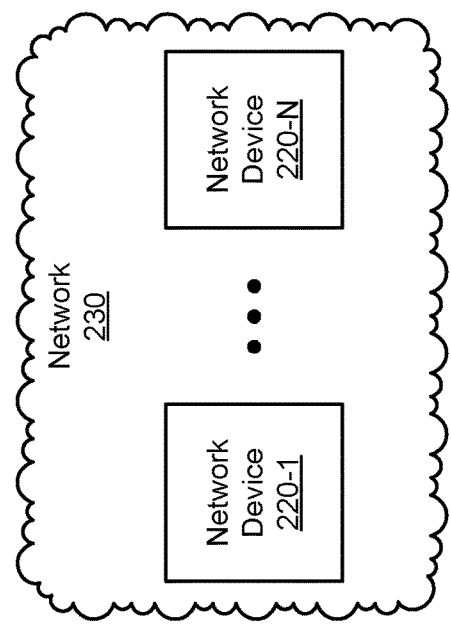
FIG. 2 is a diagram of an example environment in which systems and/or methods described herein may be implemented.
Figure 2:
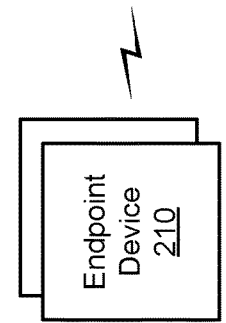

FIG. 2 is a diagram of an example environment 200 in which systems and/or methods described herein may be implemented. As shown in FIG. 2, environment 200 may include one or more endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210, via network 230 (e.g., by routing the network traffic using network devices 220 as intermediaries).

Network device 220 includes one or more devices capable of receiving, processing, storing, routing, and/or providing network traffic in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route network traffic through network 230. In some implementations, network device 220 may receive network traffic (e.g. from endpoint device 210); may determine a source zone, a destination zone, a source zone group, and/or a destination zone group associated with the network traffic; may identify, based on the source zone, the destination zone, the source zone group, and/or the destination zone group, a set of security policies; and may apply a security policy, of the set of security policies, to the network traffic.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
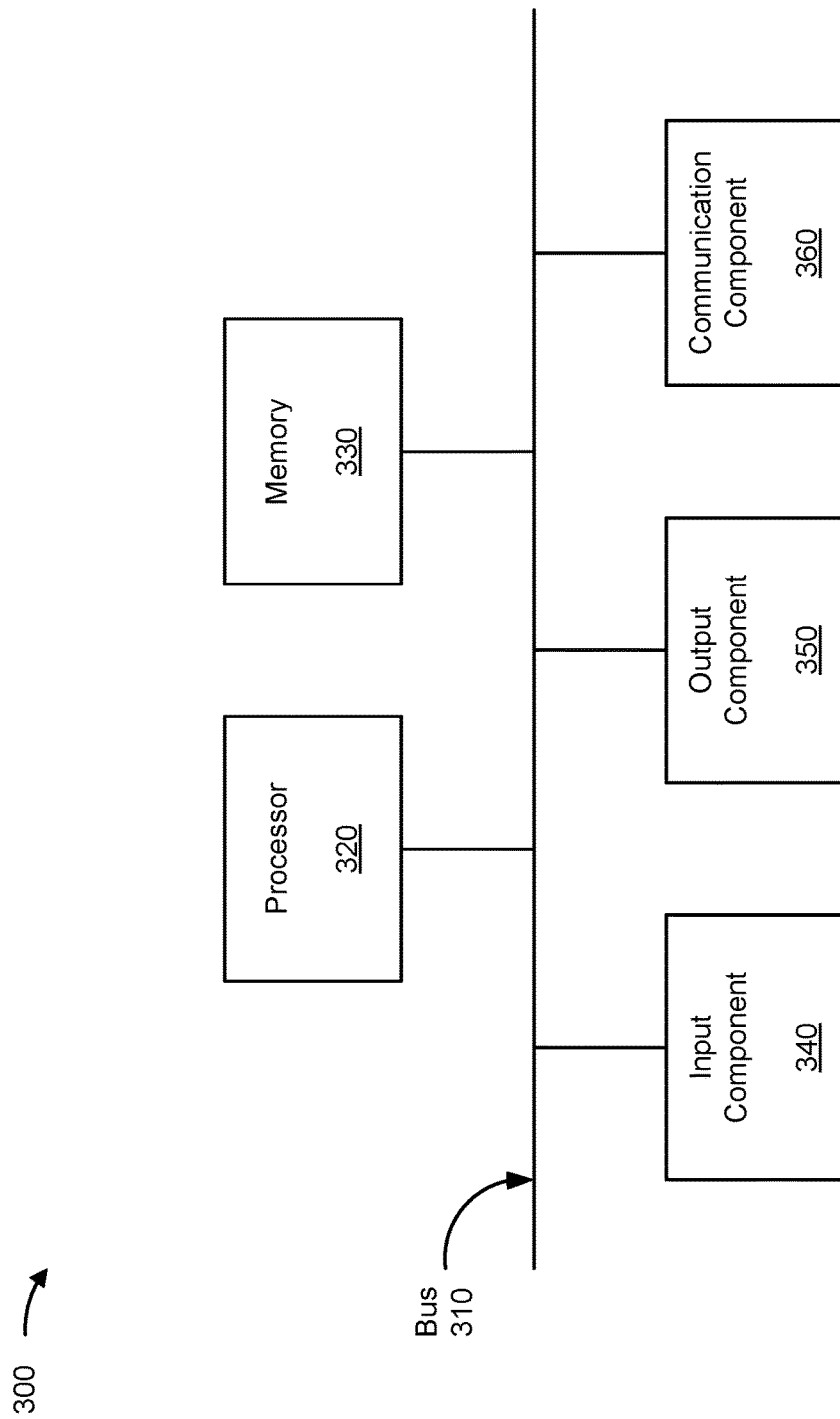
FIGS. 3 and 4 are diagrams of example components of one or more devices of FIG. 2.

FIG. 3 is a diagram of example components of a device 300, which may correspond to endpoint device 210 and/or network device 220. In some implementations, endpoint device 210 and/or network device 220 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
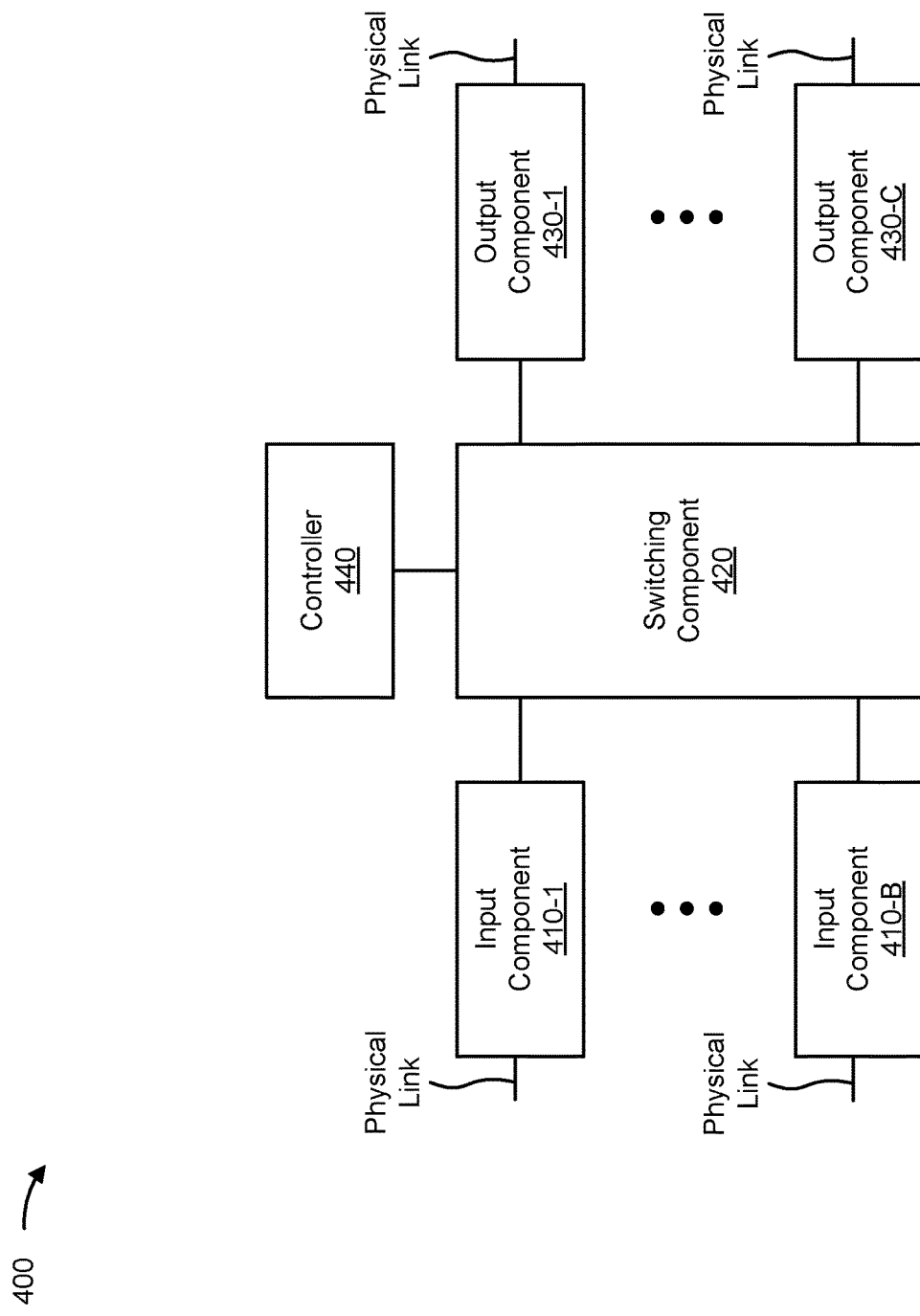

FIG. 4 is a diagram of example components of a device 400. Device 400 may correspond to endpoint device 210 and/or network device 220. In some implementations, endpoint device 210 and/or network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
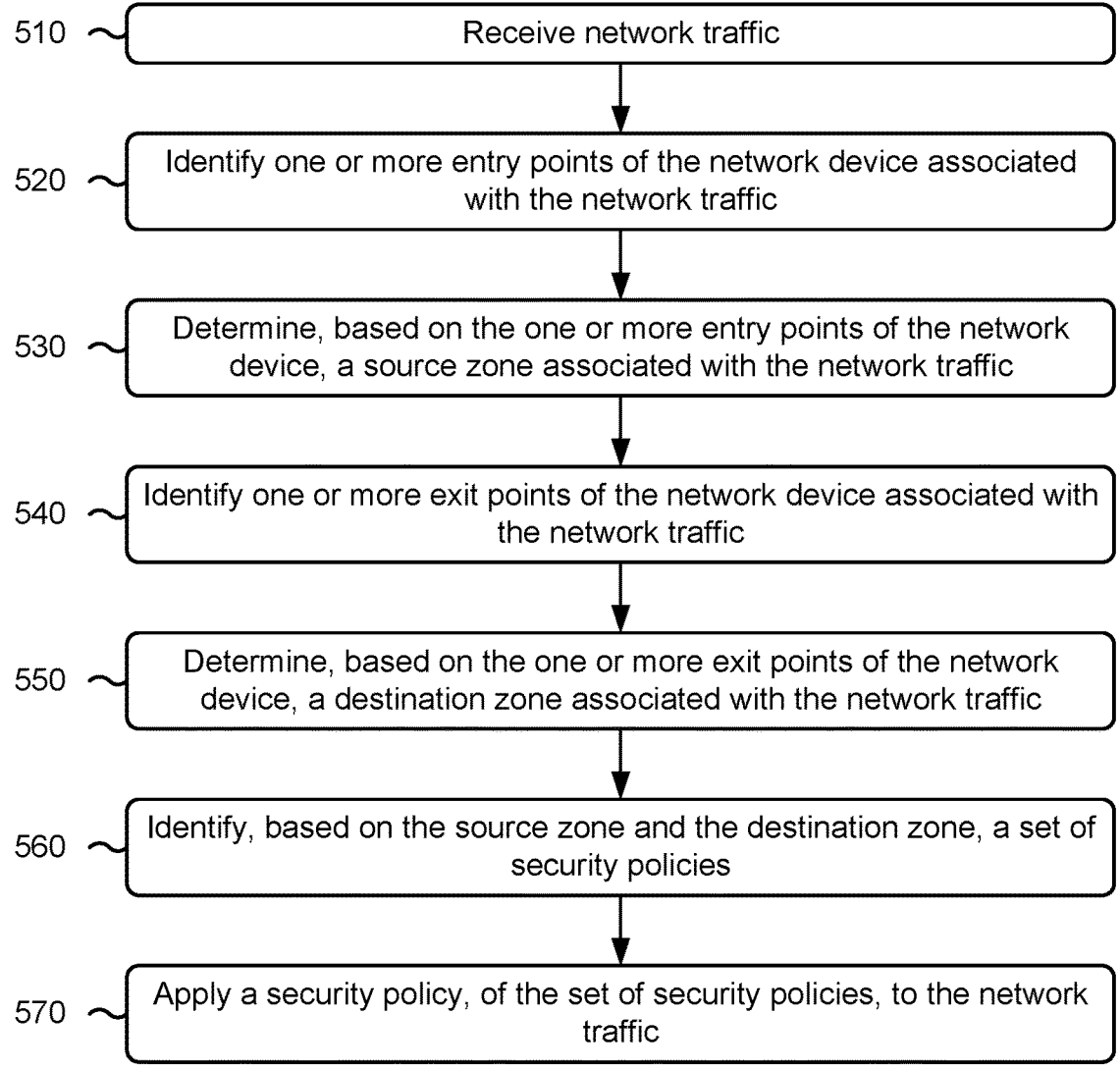
FIG. 5 is a flowchart of an example process relating to using zone groups based on entry points and exit points of a network device to apply a security policy to network traffic.

FIG. 5 is a flowchart of an example process 500 associated with using zones based on entry points and exit points of a network device to apply a security policy to network traffic. In some implementations, one or more process blocks of FIG. 5 are performed by a network device (e.g., network device 220). In some implementations, one or more process blocks of FIG. 5 are performed by another device or a group of devices separate from or including the network device, such as an endpoint device (e.g., endpoint device 210). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include receiving network traffic (block 510). For example, the network device may receive network traffic, as described above.

As further shown in FIG. 5, process 500 may include identifying one or more entry points of the network device associated with the network traffic (block 520). For example, the network device may identify one or more entry points of the network device associated with the network traffic, as described above.

As further shown in FIG. 5, process 500 may include determining, based on the one or more entry points of the network device, a source zone associated with the network traffic (block 530). For example, the network device may determine, based on the one or more entry points of the network device, a source zone associated with the network traffic, as described above.

As further shown in FIG. 5, process 500 may include identifying one or more exit points of the network device associated with the network traffic (block 540). For example, the network device may identify one or more exit points of the network device associated with the network traffic, as described above.

As further shown in FIG. 5, process 500 may include determining, based on the one or more exit points of the network device, a destination zone associated with the network traffic (block 550). For example, the network device may determine, based on the one or more exit points of the network device, a destination zone associated with the network traffic, as described above.

As further shown in FIG. 5, process 500 may include identifying, based on the source zone and the destination zone, a set of security policies (block 560). For example, the network device may identify, based on the source zone and the destination zone, a set of security policies, as described above.

As further shown in FIG. 5, process 500 may include applying a security policy, of the set of security policies, to the network traffic (block 570). For example, the network device may apply a security policy, of the set of security policies, to the network traffic, as described above.

Process 500 may include additional implementations, such as any single implementation or any combination of implementations described below and/or in connection with one or more other processes described elsewhere herein.

In a first implementation, the one or more entry points of the network device include at least one of an entry port of the network device, or an entry interface of the network device.

In a second implementation, alone or in combination with the first implementation, the one or more exit points of the network device include at least one of an exit port of the network device, or an exit interface of the network device.

In a third implementation, alone or in combination with one or more of the first and second implementations, identifying the one or more entry points of the network device includes determining, based on receiving the network traffic, at least one of an entry port of the network device or an entry interface of the network device on which the network device received the network traffic, and identifying at least one of the entry port or the entry interface as the one or more entry points of the network device.

In a fourth implementation, alone or in combination with one or more of the first through third implementations, identifying the one or more exit points of the network device includes processing the network traffic to identify a destination of the network traffic, searching, based on the destination of the network traffic, a data structure to identify at least one of an exit port of the network device or an exit interface of the network device on which the network device is to forward the network traffic, and identifying at least one of the exit port or the exit interface as the one or more exit points of the network device.

In a fifth implementation, alone or in combination with one or more of the first through fourth implementations, identify the set of security policies includes searching, based on the source zone and the destination zone, a first data structure to identify an entry that indicates the set of security policies, and identifying, based on the entry, the set of security policies.

In a sixth implementation, alone or in combination with one or more of the first through fifth implementations, identifying the set of security policies includes searching, based on the source zone and the destination zone, a first data structure to identify a first subset of security policies, searching, based on the source zone, a second data structure to identify a source zone group associated with the source zone, searching, based on the destination zone, a third data structure to identify a destination zone group associated with the destination zone, searching, based on the source zone group and the destination zone group, a fourth data structure to identify a second subset of security policies, and identifying the set of security policies as including the first subset of security policies and the second subset of security policies.

In a seventh implementation, alone or in combination with one or more of the first through sixth implementations, identifying the set of security policies includes searching, based on the source zone, a first data structure to identify a source zone group associated with the source zone, searching, based on the destination zone, a second data structure to identify a destination zone group associated with the destination zone, and searching, based on the source zone group and the destination zone group, a third data structure to identify the set of security policies.

In an eighth implementation, alone or in combination with one or more of the first through seventh implementations, applying the security policy to the network traffic is to cause the network device to block the network traffic, or causing the network device to allow the network traffic.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, network traffic may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device, comprising:
one or more memories; and
one or more processors to:
receive network traffic;
identify one or more entry points of the network device associated with the network traffic;
determine, based on the one or more entry points of the network device, a source zone associated with the network traffic,
wherein the source zone identifies a plurality of entry points, including the one or more entry points, of the network device on which the network device receives the network traffic, and
wherein the source zone identifies one or more physical entry ports of the network device or one or more logical entry interfaces of the network device;
identify one or more exit points of the network device associated with the network traffic;
determine, based on the one or more exit points of the network device, a destination zone associated with the network traffic;
identify, based on the source zone and the destination zone, a set of security policies; and,
apply a security policy, of the set of security policies, to the network traffic.

2. The network device of claim 1, wherein the one or more entry points of the network device include at least one of:
an entry port of the network device; or
an entry interface of the network device.

3. The network device of claim 1, wherein the one or more exit points of the network device include at least one of:
an exit port of the network device; or
an exit interface of the network device.

4. The network device of claim 1, wherein the one or more processors, to identify the one or more entry points of the network device, are to:
determine, based on receiving the network traffic, at least one of an entry port of the network device or an entry interface of the network device on which the network device received the network traffic; and
identify at least one of the entry port or the entry interface as the one or more entry points of the network device.

5. The network device of claim 1, wherein the one or more processors, to identify the one or more exit points of the network device, are to:
process the network traffic to identify a destination of the network traffic;
search, based on the destination of the network traffic, a data structure to identify at least one of an exit port of the network device or an exit interface of the network device on which the network device is to forward the network traffic; and
identify at least one of the exit port or the exit interface as the one or more exit points of the network device.

6. The network device of claim 1, wherein the one or more processors, to identify the set of security policies, are to:
search, based on the source zone and the destination zone, a first data structure to identify an entry that indicates the set of security policies; and
identify, based on the entry, the set of security policies.

7. The network device of claim 1, wherein the one or more processors, to identify the set of security policies, are to:
search, based on the source zone and the destination zone, a first data structure to identify a first subset of security policies;
search, based on the source zone, a second data structure to identify a source zone group associated with the source zone;
search, based on the destination zone, a third data structure to identify a destination zone group associated with the destination zone;
search, based on the source zone group and the destination zone group, a fourth data structure to identify a second subset of security policies; and
identify the set of security policies as including the first subset of security policies and the second subset of security policies.

8. The network device of claim 1, wherein the one or more processors, to identify the set of security policies, are to:
search, based on the source zone, a first data structure to identify a source zone group associated with the source zone;
search, based on the destination zone, a second data structure to identify a destination zone group associated with the destination zone; and
search, based on the source zone group and the destination zone group, a third data structure to identify the set of security policies.

9. The network device of claim 1, wherein applying the security policy to the network traffic is to:
cause the network device to block the network traffic; or
cause the network device to allow the network traffic.

10. A non-transitory computer-readable medium storing a set of instructions, the set of instructions comprising:
one or more instructions that, when executed by one or more processors of a network device, cause the network device to:
receive network traffic;
determine, based on one or more entry points of the network device that are associated with the network traffic, a source zone associated with the network traffic,
wherein the source zone identifies a plurality of entry points, including the one or more entry points, of the network device on which the network device receives the network traffic, and
wherein the source zone identifies one or more physical entry ports of the network device or one or more logical entry interfaces of the network device;
determine, based on one or more exit points of the network device that are associated with the network traffic, a destination zone associated with the network traffic;
identify, based on the source zone and the destination zone, a set of security policies; and
apply a security policy, of the set of security policies, to the network traffic.

11. The non-transitory computer-readable medium of claim 10, wherein the one or more instructions, that cause the network device to determine the source zone associated with the network traffic, cause the network device to:
determine, based on receiving the network traffic, the one or more entry points of the network device on which the network device received the network traffic; and
search, based on the one or more entry points of the network device, a data structure to determine the source zone associated with the network traffic.

12. The non-transitory computer-readable medium of claim 10, wherein the one or more instructions, that cause the network device to determine the destination zone associated with the network traffic, cause the network device to:
process the network traffic to identify a destination of the network traffic;
search, based on the destination of the network traffic, a first data structure to identify the one or more exit points of the network device on which the network device is to forward the network traffic; and
search, based on the one or more exit points of the network device, a second data structure to determine the destination zone associated with the network traffic.

13. The non-transitory computer-readable medium of claim 10, wherein the one or more instructions, that cause the network device to identify the set of security policies, cause the network device to:
search, based on the source zone and the destination zone, a data structure to identify the set of security policies.

14. The non-transitory computer-readable medium of claim 10, wherein the one or more instructions, that cause the network device to identify the set of security policies, cause the network device to:
determine, based on the source zone and the destination zone, a first subset of security policies;
determine, based on the source zone, a source zone group associated with the source zone;
determine, based on the destination zone, a destination zone group associated with the destination zone;
determine, based on the source zone group and the destination zone group, a second subset of security policies; and
identify the set of security policies as including the first subset of security policies and the second subset of security policies.

15. The non-transitory computer-readable medium of claim 10, wherein the one or more instructions, that cause the network device to identify the set of security policies, cause the network device to:
determine, based on the source zone, a source zone group associated with the source zone;
determine, based on the destination zone, a destination zone group associated with the destination zone; and
determine, based on the source zone group and the destination zone group, the set of security policies.

16. The non-transitory computer-readable medium of claim 10, wherein the one or more instructions, that cause the network device to apply the security policy to the network traffic, cause the network device to:
process the network traffic to identify one or more characteristics of the network traffic;
identify the security policy, of the set of security policies, as applicable to the one or more characteristics of the network traffic; and
apply, based on identifying the security policy, the security policy to the network traffic.

17. A method, comprising:
receiving, by a network device, network traffic;
determining, by the network device and based on one or more entry points of the network device that are associated with the network traffic, a source zone associated with the network traffic;
determining, by the network device and based on one or more exit points of the network device that are associated with the network traffic, a destination zone associated with the network traffic, wherein the destination zone identifies a plurality of exit points, including the one or more exit points, of the network device on which the network device is to forward the network traffic, and wherein the destination zone identifies one or more physical exit ports of the network device or one or more logical entry interfaces of the network device; and applying, by the network device and based on the source zone and the destination zone, a security policy to the network traffic.

18. The method of claim 17, wherein applying the security policy to the network traffic comprises:

searching, based on the source zone and the destination zone, a data structure to identify a set of security policies;

identifying the security policy, of the set of security policies, as applicable to the network traffic; and applying, based on identifying the security policy, the security policy to the network traffic.

19. The method of claim 17, wherein applying the security policy to the network traffic comprises:

determining, based on the source zone and the destination zone, a first subset of security policies;

determining, based on the source zone, a source zone group associated with the source zone;

determining, based on the destination zone, a destination zone group associated with the destination zone;

determining, based on the source zone group and the destination zone group, a second subset of security policies;

identifying a set of security policies as including the first subset of security policies and the second subset of security policies;

identifying the security policy, of the set of security policies, as applicable to the network traffic; and applying, based on identifying the security policy, the security policy to the network traffic.

20. The method of claim 17, wherein applying the security policy to the network traffic comprises:

determining, based on the source zone, a source zone group associated with the source zone;

determining, based on the destination zone, a destination zone group associated with the destination zone;

determining, based on the source zone group and the destination zone group, a set of security policies;

identifying the security policy, of the set of security policies, as applicable to the network traffic; and applying, based on identifying the security policy, the security policy to the network traffic.

* * * * *